United States Patent [19]

Osanai et al.

[11] Patent Number: 4,653,004
[45] Date of Patent: Mar. 24, 1987

[54] METHOD AND APPARATUS FOR CONTROLLING CONTINUOUSLY VARIABLE TRANSMISSION FOR VEHICLE

[75] Inventors: Akinori Osanai, Susono; Takao Niwa, Toyota; Takeshi Gono, Susono, all of Japan

[73] Assignee: Toyota Jidosha Kabushiki Kaisha, Toyota, Japan

[21] Appl. No.: 642,441

[22] Filed: Aug. 20, 1984

[30] Foreign Application Priority Data

Aug. 22, 1983 [JP] Japan ................................. 58-152885

[51] Int. Cl.$^4$ .............................................. B60K 41/12
[52] U.S. Cl. .................................... 364/424.1; 74/866; 474/18
[58] Field of Search ................ 364/424.1; 74/856, 857, 74/858, 859, 860, 861, 862, 863, 864, 865, 866; 474/12, 18, 28

[56] References Cited

U.S. PATENT DOCUMENTS

| | | | |
|---|---|---|---|
| 4,507,986 | 4/1985 | Okamura et al. | 74/866 |
| 4,509,125 | 4/1985 | Fattic et al. | 474/18 |
| 4,515,040 | 5/1985 | Takeuchi et al. | 74/866 |
| 4,515,041 | 5/1985 | Frank et al. | 74/866 |
| 4,516,652 | 5/1985 | Tanigawa et al. | |
| 4,546,673 | 10/1985 | Shigematsu et al. | 74/866 |

FOREIGN PATENT DOCUMENTS

0059426  8/1982  European Pat. Off. .

Primary Examiner—Parshotam S. Lall
Attorney, Agent, or Firm—Oblon, Fisher, Spivak, McClelland & Maier

[57] ABSTRACT

Method and apparatus for controlling a continuously variable transmission operatively connecting an engine and drive wheels of a vehicle, wherein a speed ratio of the transmission is controlled such that an actual engine speed coincides with a target engine speed determined based on a currently required engine output and according to a predetermined relation between the target engine speed and the required engine output. The method and apparatus comprise a step or device for restraining a rate of variation in the speed ratio during a time span between the moment when the actual engine speed or output has exceeded a variation-restraint trigger speed or output of the engine, and the moment when the actual engine speed or output has reached the target speed or output. The trigger engine speed or output is determined based on a predetermined transmission efficiency of the transmission, and on the target engine speed or output, and is lower or smaller than the target engine speed or output.

14 Claims, 9 Drawing Figures

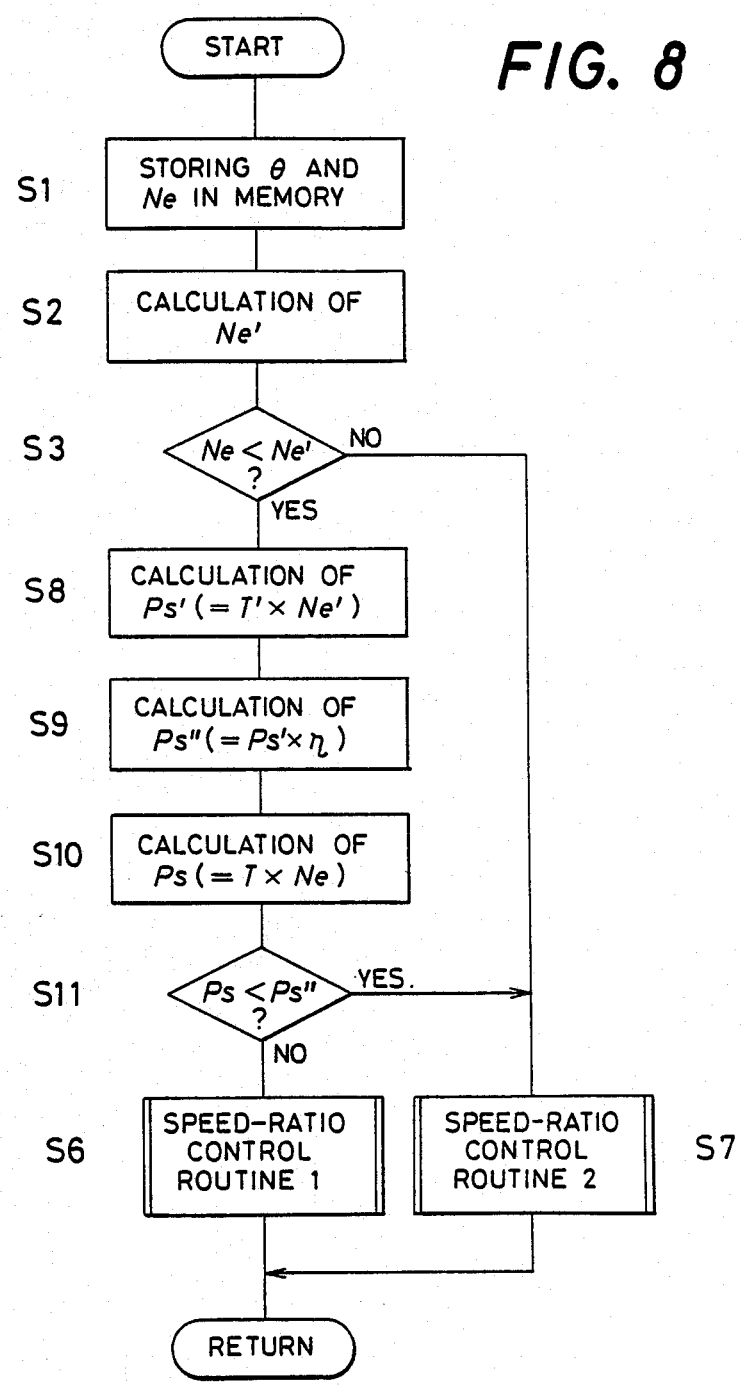

METHOD AND APPARATUS FOR CONTROLLING CONTINUOUSLY VARIABLE TRANSMISSION FOR VEHICLE

BACKGROUND OF THE INVENTION

The present invention relates generally to a method and an apparatus for controlling a speed ratio of a continuously variable transmission for a vehicle, and more particularly to impovements in such method and apparatus for increased fuel economy of the vehicle during acceleration periods.

In the art of a continuously variable transmission for a vehicle to transmit a rotary motion of an engine to drive wheels with a continuously variable ratio, a control apparatus is known which comprises regulating means for controlling the speed ratio of the variable transmission (ratio of a rotating speed of its output shaft to a rotating speed of its input shaft) such that an actual speed of the engine coincides with a target speed thereof which is determined based on a currently required output of the engine and according to a predetermined relation between the target speed and the required output of the engine. With such a known control apparatus to control the speed ratio of a variable transmission, the actual engine speed is controlled into conformity with a target engine speed which is continuously or intermittently determined so that the specific-fuel consumption is minimum. Thus, the control apparatus permits the transmission and the engine to operate with a high fuel economy over an entire range of the vehicle speed, particularly while the vehicle is running in a relatively stable conditions or at a relatively constant speed. In a continuously variable transmission, however, it is generally recognized that the transmission efficiency is unavoidably reduced in a process of changing the speed ratio. According to a controlling method practiced by the known control apparatus for the variable transmission, the speed ratio of the transmission is rapidly varied during acceleration of the vehicle, because the target speed of the engine is rapidly increased in response to a rapid increase in the required output of the engine as a result of an abrupt depression of an accelerator pedal for acceleration. Therefore, the transmission efficiency of the variable transmission and consequently the fuel economy of the vehicle are reduced during acceleration of the vehicle. In short, the known apparatus for controlling a continuously or steplessly variable transmission suffers the problem of relatively low fuel economy.

SUMMARY OF THE INVENTION

It is therefore an object of the present invention to provide improved method and apparatus for controlling a speed ratio of a continuously variable transmission for a vehicle, which are capable of maintaining a high fuel economy of the vehicle even while the vehicle is in acceleration.

According to the invention, there is provided a method of controlling a speed ratio of a continuously variable transmission for a vehicle for transmitting a rotary motion of an engine to drive wheels of the vehicle with a stepless speed change, by regulating the speed ratio of the transmission such that an actual speed of the engine coincides with a target speed thereof which is determined based on a currently required output of the engine and according to a predetermined relation between the target speed and the required output of the engine, said method comprising the steps of: (a) determining a variation-restraint trigger speed of the engine based on a predetermined transmission efficiency of the transmission and based on the determined target speed of the engine, the variation-restraint trigger speed being lower than the determined target engine speed; and (b) restraining a rate of variation in the speed ratio of the transmission during a time span between a first moment when the actual speed of the engine has exceeded the variation-restraint trigger speed, and a second moment when the actual speed has reached the target speed.

According to the invention, there is also provided an apparatus for practicing the above method of the invention, including regulating means for controlling the speed ratio of the transmission such that an actual speed of the engine coincides with a target speed thereof which is determined based on a currently required output of the engine and according to a predetermined relation between the target speed and the required output of the engine. The apparatus comprises: (a) means for determining a variation-restraint trigger speed of the engine based on a predetermined transmission efficiency of the transmission and based on the determined target speed of the engine, the variation-restraint trigger speed being lower than the target speed of the engine; and (b) means for restraining a rate of variation in the speed ratio of the transmission during a time span between a first moment when the actual speed of the engine has exceeded the variation-restraint trigger speed, and a second moment when the actual speed has reached the target speed.

In the controlling apparatus constructed as described above, the variation in the speed ratio of the variable transmission is restrained by the restraining means immediately after the actual engine speed has exceeded the variation-restraint trigger speed determined by the trigger speed determining means, and until the actual engine speed has reached the target engine speed. While the actual engine speed is elevated from the variation-restraint trigger speed up to the target speed during acceleration of the vehicle, the rotary motion of the engine is transmitted through the transmission with a substantially constant speed ratio, because the rate of variation in the speed ratio is restrained or inhibited during that time span. Accordingly, otherwise possible reduction in transmission efficiency of the transmission due to variation in the speed ratio is minimized, and as a result the engine is operated with a relatively high fuel economy. Further, since the variation-restraint trigger speed of the engine is determined based on a transmission efficiency of the transmission during acceleration of the vehicle and on the target engine speed, the output of the engine obtained with a substantially constant speed ratio of the transmission is at least equivalent to that which is obtained during acceleration of a vehicle where the transmission is controlled by a known control apparatus. This means that the restraint of the speed ratio variation of the transmission according to the invention will not impair the acceleration performance, or drivability of the vehicle.

According to another aspect of the invention, there is provided a method of controlling a speed ratio of a continuously variable transmission for a vehicle for transmitting a rotary motion of an engine of the vehicle to drive wheels of the vehicle with a stepless speed change, by regulating the speed ratio of the transmission such that an actual speed of the engine coincides with a target speed thereof which is determined based on a currently required output of the engine and according to a predetermined relation between the target speed and the required output of the engine, the method comprising the steps of: (a) determining an actual output (horsepower or torque) of the engine based on the actual speed of the engine; (b) determining a target output (horsepower or torque) of the engine to obtain the target speed of the engine; (c) determining a variation-restraint trigger output of the engine based on a predetermined transmission efficiency of the transmission and based on the determined target output of the engine, the variation-restraint trigger output being smaller than the determined target output; and (d) restraining a rate of variation in the speed ratio during a time span between a first moment when the actual output of the engine has exceeded the variation-restraint trigger output, and a second moment when the actual output has reached the target output.

According to the invention, there is further provided an apparatus for practicing the above method of the invention. The instant apparatus comprises: (a) first determining means for determining an actual output (horsepower or torque of the engine based on the actual speed of the engine and based on the currently required output (horsepower or torque) of the engine; (b) second determining means for determining a target output (horsepower or torque of the engine so as to obtain the target speed of the engine; (c) third determining means for determining a variation-restraint trigger output of the engine based on a transmission efficiency of the transmission during acceleration of the vehicle and based on the determined target output of the engine, the variation-restraint trigger output being smaller than the determined target output; and (d) means for restraining a rate of variation in the speed ratio during a time span between a first moment when the actual output of the engine has exceeded the variation-restraint trigger output, and a second moment when the actual output has reached the target output.

In the controlling apparatus constructed according to the above aspect of the invention, the variation in the speed ratio of the variable transmission is restrained by the restraining means during a time span between the moment when the actual output of the engine determined by the first determining means has exceeded the variation-restraint trigger output determined by the third determining means, and the moment when the actual engine speed has reached the target engine output determined by the second determining means. Thus, the previously indicated advantages are provided according to this aspect of the invention.

A further advantage of this aspect of the invention stems from the use of the variation-restraint trigger output to establish the timing at which the restraint of the speed ratio variation is initiated. In this case, the variation-restraint trigger output is determined based on a predetermined transmission efficiency of the transmission and on the determined target engine output. Therefore, the timing of starting the restraint of the speed ratio variation can be determined to assure higher drivability and fuel economy of the vehicle, than in the case where the engine speed is used to trigger the restraint of the speed ratio variation.

In a preferred embodiment of the invention, the transmission efficiency used for determining the variation-restraint trigger speed or output of the engine is an efficiency during a rapid change in the speed ratio of the transmission. According to one form of the above embodiment, the variation-restraint trigger speed or output is obtained by multiplying the target engine speed or output by a value of the predetermined efficiency of the transmission.

BRIEF DESCRIPTION OF THE DRAWING

The above and other objects, features and advantages of the present invention will be better understood from reading the following description of the preferred embodiments taken in conjunction with the accompanying drawing in which:

FIGS. 8 and 9 are views showing another embodiment of the invention, corresponding to FIGS. 5 and 2, respectively.

DETAILED DESCRIPTION OF THE PREFERRED EMBODIMENTS

Figure 1:
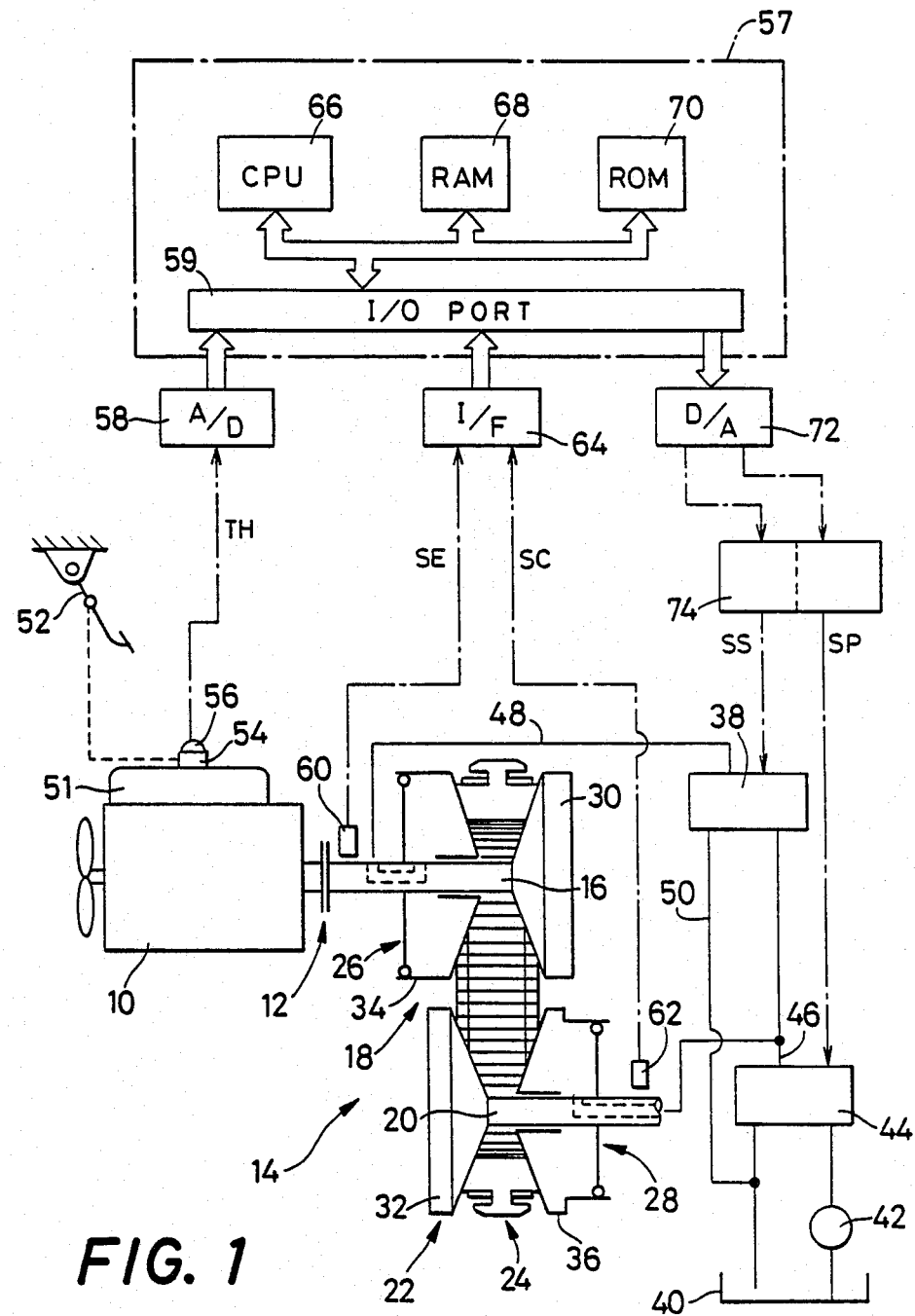
FIG. 1 is a schematic illustration of one embodiment of an apparatus of the invention for controlling a continuously variable transmission for a vehicle.

Referring to the accompanying drawing showing a preferred embodiment of the invention, there is shown in FIG. 1 a continuously variable transmission 14 (CVT 14) of belt-and-pulley type which is operatively connected to an engine 10 of a vehicle through a clutch 12. The variable transmission 14 serves to transmit the output of the engine 10 to drive wheels (not shown) of the vehicle such that a speed ratio of the engine 10 and the drive wheels relative to each other is steplessly variable. The variable transmission 14 comprises: a drive or input shaft 16 coupled to the clutch 12; a first variable-diameter pulley 18 having a variable effective diameter and associated with the input shaft 16; a driven or output shaft 20; a second variable-diameter pulley 22 having a variable effective diameter and associated with the output shaft 20; a transmission belt 24 connecting the first and second variable-diameter pulleys 18 and 22; and hydraulic cylinders 26 and 28 associated with the pulleys 18 and 22, respectively, to change widths of Vee-grooves of the pulleys 18, 22 for varying their effective diameters engaging the belt 24. The first pulley 18 includes an axially stationary rotor 30 fixed to the input shaft 16, and an axially movable rotor 34 which is mounted on the input shaft 16 axially slidably relative to the rotor 30 but not rotatable relative to the shaft 16. Similarly, the second pulley 22 includes an axially stationary rotor 32 fixed to the output shaft 20, and an axially movable rotor 36 mounted on the output shaft 20 slidably relative to the rotor 32 but not rotatable relative to the shaft 20. The movable rotors 34 and 36 are slidably moved on the respective input and output shafts 16 and 20 with a hydraulic pressure applied to pressure chambers in the hydraulic cylinders 26, 28, whereby the effective diameters of the first and second pulleys 18, 22 engaging the belt 24 may be continuously varied. The hydraulic cylinder 28 is normally subject to a line pressure of a hydraulic system, while the hydraulic cylinder 26 is subject to a variable hydraulic pressure which is adjusted through a speed-ratio control valve 38 incorporated in the hydraulic system. Thus, a balance of hydraulic pressures exerted on the movable rotors 34 and 36 is changed, and consequently the speed ratio of the output shaft 20 with respect to the input shaft 16 may be varied. In this connection, it is noted that the movable rotor 34 has a larger pressure receiving area than the movable rotor 36.

The hydraulic line pressure normally applied to the hydraulic cylinder 28 is obtained from a pressure control valve 44 which adjusts a pressure of a pressurized working fluid which is pumped by a pump 42 from an oil reservoir 40. The line pressure is fed to the hydraulic cylinder 28 and to the speed-ratio control valve 38 through a conduit 46. The pressure control valve 44 comprises a linear solenoid operable in response to a PRESSURE CONTROL signal SP which will be described, and further comprises a valving member driven by the linear solenoid. The line pressure supplied from the pressure control valve 44 is regulated by changing, according to the PRESSURE CONTROL signal SP, a relief amount of the fluid which is fed back to the oil reservoir 40 to relieve a part of the fluid pressure in the pressure control valve 44. The speed-ratio control valve 38 comprises a linear solenoid operable in response to a SPEED RATIO signal SS which will be described, and further comprises a valving member driven by the linear solenoid to control amounts of the working fluid which are supplied to or discharged from the hydraulic cylinder 26. More specifically described, the speed-ratio control valve 38 is connected to the hydraulic cylinder 26 through a conduit 48, and to the oil reservoir 40 through a drain conduit 50. A movement of the valving member of the speed-ratio control valve 38 in one direction enables the conduit 46 to communicate with the conduit 48, and permits a variation in area of their communication within the speed-ratio control valve 38, thereby adjusting an amount of the fluid to be supplied to the hydraulic cylinder 26. On the other hand, a movement of the valving member of the speed-ratio control valve 38 in the opposite direction enables the conduit 48 to communicate with the drain conduit 50, and permits a variation in area of their communication in the speed-ration control valve 38, thereby adjusting an amount of the fluid to be discharged from the hydraulic cylinder 26 back to the oil reservoir 40. While the valving member of the speed-ratio control valve 38 is placed in its neutral position at which the conduit 48 is held in a substantially disconnected relation with both of the conduits 6 and 50, the amount of the pressurized fluid (hydraulic pressure) within the hydraulic cylinder 26 is held substantially constant and consequently the movable rotor 34 is located at a fixed axial position on the input shaft 16, whereby the speed ratio of the transmission 14 is held constant. When the conduit 48 is brought into communication with the conduit 46 due to the movement of the valving member of the speed-ratio control valve 38, the amount of the fluid (hydraulic pressure) within the hydraulic cylinder 26 is increased and consequently the movable rotor 34 is moved away from the stationary rotor 30, with a result of increasing the effective diameter of the first pulley 18 and decreasing that of the second pulley 22, whereby the speed ratio of the transmission 14 is made higher. Conversely, when the conduit 48 is put into communication with the drain conduit 50, the movable rotor 34 is moved towards the stationary rotor 30, whereby the speed ratio is lowered.

The engine 10 is provided with an intake manifold 51 in which is disposed a throttle valve 54 linked with an accelerator pedal 52. An opening angle $\theta$ of the throttle valve 54 is detected by a throttle sensor 56 which is attached to the throttle valve 54 as means for detecting a currently required output of the engine 10. The throttle sensor 56 generates a voltage signal, i.e., a THROTTLE signal TH which corresponds to the opening angle $\theta$ of the throttle valve 54. The THROTTLE signal TH is applied to an I/O (input/output) port 59 of a microcomputer 57 through an A/D (analog/digital) converter 58. Adjacent to the input and output shafts 16 and 20, there are respectively disposed a first and a second rotation sensor 60, 62. The first rotation sensor 60 serves as engine speed detecting means which detects a rotating speed of the input shaft 16 and produces an INPUT ROTATION signal SE whose number of pulses corresponds to the number of revolution of the engine 10. On the other hand, the second rotation sensor 62 serves as vehicle speed detecting means which detects a rotating speed of the output shaft 20 and produces an OUTPUT ROTATION signal SC whose number of pulses corresponds to a running speed of the vehicle. These INPUT and OUTPUT ROTATION signals SE and SC are fed to an I/F circuit (interface circuit) 64, which converts the ROTATION signals SE and SC into coded signals which represent the number of pulses per unit time of the signals SE, SC. These coded signals are applied to the I/O port 59.

The I/O port 59 is connected through a data bus line to a CPU 66 (central processing unit), a RAM 68 (random-access memory), and a ROM 70 (read-only memory). The CPU 66 is operated according to a program which is stored in the ROM 70 provided as one memory means, and utilizes a temporary data storage function of the RAM 68 which is provided as another memory means. The CPU 66 thus cooperated by the RAM 68 and the ROM 70, processes signals to be fed to the I/O port 59. Further, the CPU 66 feeds to a D/A (digital-/analog) converter 72 and a driver circuit 74 the SPEED RATIO signal SS representing a speed ratio "e" and a variation rate "e" ($=\Delta e/\Delta t$) at which the speed ratio "e" is varied. The CPU 66 further feeds to the converter 59 and the driver circuit 74 the PRESSURE CONTROL signal SP representing the line pressure of the hydraulic system. The driver circuit 74, which is a power amplifier, amplifies the SPEED RATIO and PRESSURE CONTROL signals SS, SP from the D/A converter 72 and applies the amplified SPEED RATIO and PRESSURE CONTROL signals SS, SP to the linear solenoids of the speed-ratio control valve 38 and the pressure control valve 44.

Figure 2:
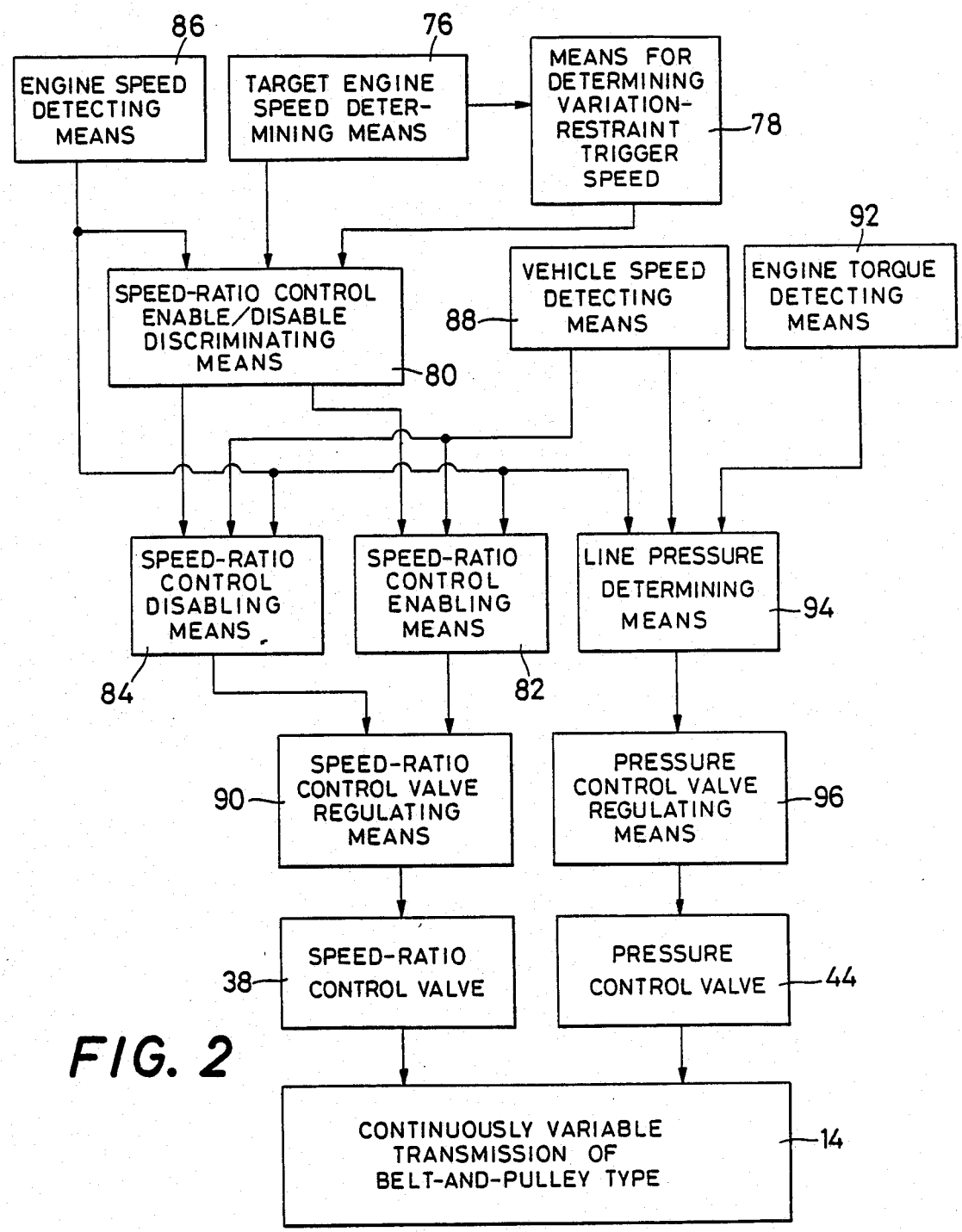
FIG. 2 is a schematic block diagram generally showing a control arrangement for the transmission of FIG. 1.

FIG. 2 is a schematic diagram generally showing a control arrangement for the variable transmission 14. Target engine speed determining means 76 determines a target engine speed Ne' (rotating speed of the input shaft 16) based on the opening angle $\theta$ of the throttle valve 54 represented by the THROTTLE signal TH, and according to a predetermined and stored relation between the opening angle $\theta$ and the target engine speed Ne', which relation is represented by a graph of FIG. 3. The target engine speed Ne' is determined such that the required horsepower of the engine 10 (required engine output) represented by the opening angle $\theta$ of the throttle valve 54 is obtained with a minimum specific fuel consumption. Means 78 determines a later described variation-restraint trigger speed Ne" by multiplying the target engine speed Ne' by a predetermined efficiency $\eta$ of the variable transmission 14. This efficiency $\eta$ is a value which is commonly established during a rapid change in the speed ratio of the transmission 14 under acceleration of the vehicle when the transmission 14 is controlled by a known control apparatus. For example, the efficiency is approx. 90%. Speed-ratio control enable/disable discriminating means 80 activates selectively speed-ratio control enabling means 82 or speed-ratio control disabling means 84. More specifically described, the speed-ratio control enabling means 82 is activated when an actual speed Ne of the engine 10 detected by the engine speed detecting means 86 (i.e., actual rotating speed Ni of the input shaft 16 detected by the first rotation sensor 60) falls within a range between the target engine speed Ne' and the variation-restraint trigger speed Ne". Alternatively, the speed-ratio control disabling means 84 is activated when the actual engine speed (detected engine speed) Ne is not within the above range. The speed-ratio control enabling means 82, when activated by the discriminating means 82, determines an actual speed ratio "e" of the variable transmission 14 based on an actual running speed V of the vehicle detected by the vehicle speed detecting means 88 (i.e., actual rotating speed No of the output shaft 20 detected by the second rotation sensor 62), and based on the actual engine speed Ne. Simultaneously, the speed-ratio control enabling means 82 determines a target speed ratio "e'" of the transmission 14 for coincidence of the actual engine speed Ne with the target engine speed Ne', and directs regulating means 90 for controlling the speed-ratio control valve 38 and thereby controlling the variable transmission 14 such that a difference between the actual speed ratio "e" and the targt speed ratio "e'" is zeroed. When the speed-ratio control disabling means 84 is activated by the discriminating means 80, the disabling means 84 causes the target speed ratio "e'"" to be replaced by the actual speed ratio "e" and interrupts or inhibits a change in the speed ratio of the transmission 14, thereby controlling the actual engine speed Ne for coincidence with the target engine speed Ne' without changing the speed ratio "e" of the transmission 14. The speed-ratio control valve regulating means 90 feeds the SPEED RATIO signal SS to the speed-ratio control valve 38, which is operated in response to the SPEED RATIO signal SS to vary the speed ratio "e".

Figure 4:
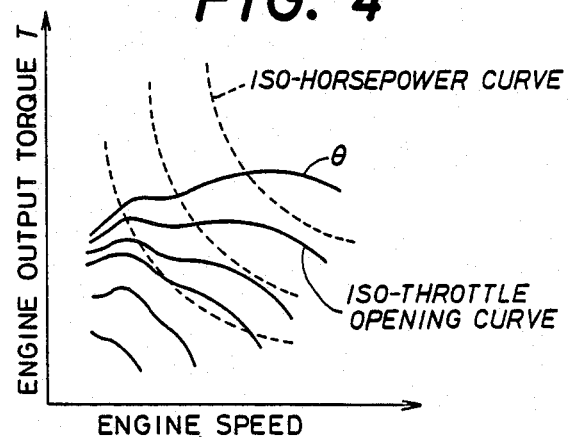
FIG. 4 is a graph representing iso-horsepower curves and iso-throttle valve opening curves as a function of engine speed and output torque of the vehicle.

Engine torque detecting means 92 detects an actual output torque T based on the opening angle $\theta$ of the throttle valve 54 (representing the currently required output of the engine 10) and on the actual engine speed Ne, and according to a predetermined and stored relation among the actual engine speed Ne, throttle valve opening angle $\theta$ and engine output torque T, which relation is represented by a graph of FIG. 4. Line pressure determining means 94 determines a line pressure in the conduit 46 based on the actual output torque T of the engine 10, actual engine speed Ne detected by the engine speed detecting means 86 (60), and actual rotating speed No of the output shaft 20 detected by the vehicle speed detecting means 88 (62), and according to a predetermined relation among the above values T, Ne and No. To establish the line pressure deteremined by the line pressure determining means 94, regulating means 94 feeds the PRESSURE CONTROL signal SP to the pressure control valve 44 to regulate the operation of the valve 44. As a result, the line pressure is maintained at a minimum level necessary to prevent a torque transmission loss due to slip of the belt 24 on the pulleys 18, 22, whereby otherwise possible power loss and shortened service life of the belt 24 due to excessive tension thereto may be avoided.

Referring next to a flow chart of FIG. 5, the operation of the present invention will be described.

Figure 3:
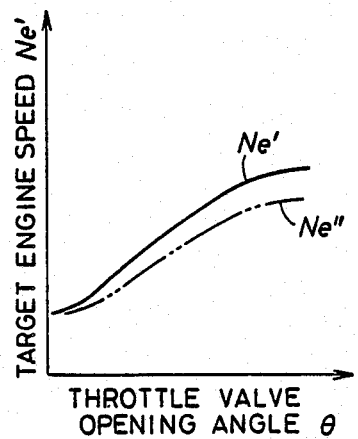
FIG. 3 is a graphical representation of a characteristic relation between an angle of a throttle valve opening, and a target engine speed.

At first, step S1 is executed to store in the RAM 68 data on the opening angle $\theta$ of the throttle valve 54 and data on the actual engine speed Ne, according to the THROTTLE and INPUT ROTATION signals TH and SE. Step S1 is followed by step S2 which corresponds to the target engine speed determining means 76 previously indicated. In step S2, the target engine speed Ne' is calculated based on the opening angle $\theta$ and according to the stored relation of FIG. 3. Then, step 3 is performed to check if the actual engine speed Ne is lower than the target engine speed Ne'. In the case where the actual engine speed Ne is higher than the target engine speed Ne', step S3 is followed by step S7 in which a speed-ratio control routine 2 is executed as described later. In the case where the actual engine speed Ne is lower than the target engine sped Ne', step S3 is followed by step S4 which corresponds to the determining means 78 for determining the variation-restraint trigger speed Ne". In step S4, the variation-restraint trigger speed Ne" as shown in broken line in FIG. 3 is calculated by multiplying the target engine speed Ne' by an efficiency $\eta$ of the variable transmission 14, which is a common value obtained during a rapid change in the speed ratio "e" of the transmission 14 while the vehicle is in acceleration where the transmission 14 is operated under control of a known control apparatus, as previously described. This efficiency percent used in the calculation may be an average value during periods of acceleration of the vehicle. Subsequently, step S5 is executed to check if the actual engine speed Ne is smaller than the variation-restraint trigger speed Ne". If the checking reveals that the speed Ne is smaller than the variation-restraint trigger speed Ne", the speed-ratio control routine 2 is performed in step S7. If the speed Ne is not smaller than the speed Ne", that is, if the speed Ne has been raised to a level at which the engine 10 is able to provide, without a change in the speed ratio "e", an output ($T \times Ne$) not less than the output ($T \times Ne' \times \eta$) which is obtained during acceleration of the vehicle if and when the transmission 14 is controlled by a known apparatus, step S5 is followed by step S6 wherein a speed-ratio control routine 1 is effected. In other words, steps S3 and S5 correspond to the previously described discriminating means 80 which selects the speed-ratio control routine 1 when the actual engine speed Ne falls within the range between the speeds Ne' and Ne", but selects the speed-ratio control routine 2 when the actual engine speed Ne does not fall within the above range.

Figure 6:
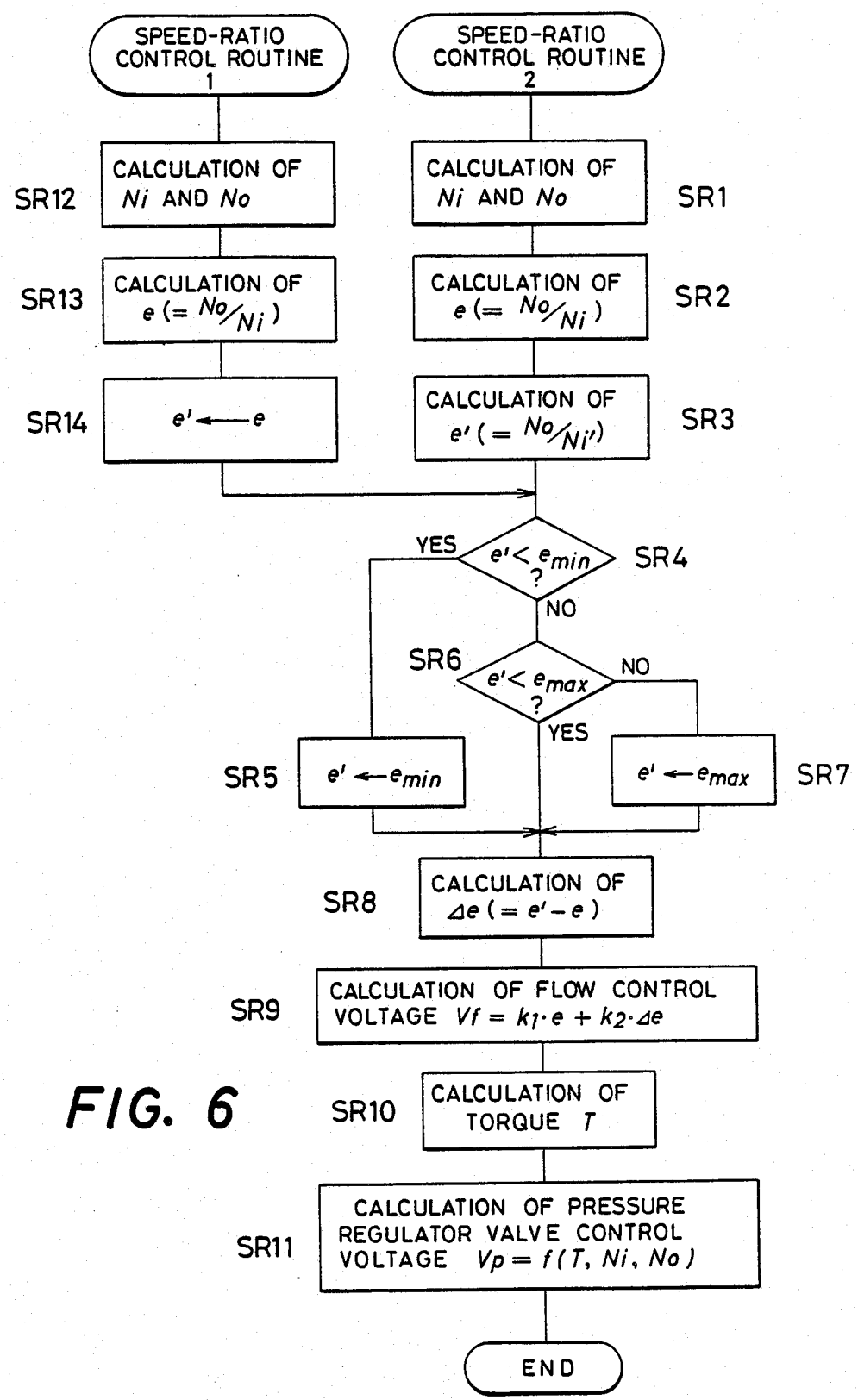

The speed-ratio control routines 1 and 2 are executed in the manner as illustrated in FIG. 6 and as described below.

In the speed-ratio control routine 2, step SR1 is executed at first, wherein the rotating speeds Ni and No of the input and output shafts 16 and 20 of the variable transmission 14 are calculated based on the INPUT and OUTPUT ROTATION signals SE and SC, repsectively. Then, step SR2 is executed to calculate the actual speed ratio "e" ($=No/Ni$) of the variable transmission 14 based on the calculated rotating speeds Ni and No of the input and output shafts 16, 20. Step SR2 is followed by step SR3 in which the target speed ratio "e'" ($=No/Ni'$) is calculated, and then by step S4 to check if the target speed ratio "e'" is lower than a minimum ratio "e"$_{min}$. If the ratio "e'" is lower than the minimum ratio "e"$_{min}$, step S5 is executed to set the target speed ratio "e'" at the minimum ratio "e"$_{min}$. If the ratio "e'" is not lower than the minimum ratio "e"$_{min}$, step SR4 is followed by step SR6 to check if the target speed ratio "e'" is lower than a maximum ratio "e"$_{max}$. If the ratio "e'" is not lower than the maximum ratio "e"$_{max}$, step SR6 is followed by step SR7 in which the target speed ratio "e'" is set at the maximum ratio "e"$_{max}$. If the ratio "e'" is lower than the maximum ratio "e"$_{max}$, step SR6 is followed by step SR8.

In step SR8, an error "$\Delta e$" ($=$"$e'$"$-$"$e$") is obtained by subtracting the actual speed ratio "e" from the target speed ratio "e'". Then, in step SR9, a flow control voltage Vf to zero the error "$\Delta e$" is determined according to the following formula (1):

$$Vf = K_1 \cdot "e" + K_2 \cdot "\Delta e" \qquad (1)$$

where, $K_1$ and $K_2$ are constants.

The SPEED RATIO signal SS representing the flow control voltage Vf is applied to the speed-ratio control valve 38, which supplies a controlled flow of the working fluid to the hydraulic cylinder 26 according to the SPEED RATIO signal, whereby the speed ratio "e" of the variable transmission 14 is controlled. Thus, steps SR1 through SR8 correspond to the previously indicated speed-ratio control enabling means 82, and step SR9 corresponds to the previously indicated regulating means 90 for controlling the speed-ratio control valve 38.

Successively, the control goes to step SR10 which corresponds to the engine torque detecting means 92 to calculate the actual output torque T of the engine 10 according to the predetermined relation of FIG. 4. Step SR10 is followed by step SR11 corresponding to the line pressure determining means 94 and the pressure control valve regulating means 96. That is, a pressure control voltage Vp to control the hydraulic line pressure is calculated according to the following formula (2), and the PRESSURE CONTROL signal SP representing the pressure control voltage Vp is applied to the pressure control valve 44, whereby the line pressure is controlled according to the PRESSURE CONTROL signal SP.

$$Vp = f(T, Ni, No) \qquad (2)$$

In the speed-ratio control routine 1, steps SR12 and SR13 identical to steps SRT1 and SR2 of the control routine 2 are executed to calculate the rotating speeds Ni and No of the input and output shafts 16, 20, and to obtain the actual speed ratio "e" ($=No/Ni$) of the variable transmission 14. Step SR13 is followed by step SR14 in which the target speed ratio "e'" is set at the actual speed ratio "e" obtained in step SR13. Subsequently, the previously discussed steps SR4 through SR11 are carried out. Since the target speed ratio "e'38 is set at the actual speed ratio "e" in step SR14, the error "$\Delta e$" obtained in SR8 is zero, whereby a variation or change in the speed ratio "e" of the transmission 14 is inhibited. Thus, steps SR14, SR13 and SR14 correspond to the previously indicated speed-ratio control disabling means 84. These steps SR12–SR14 cooperate with the previously indicated steps S3 and S5 to constitute means for restraining a rate of variation in the speed ratio. In this connection, it is possible in step SR14 that the target speed ratio "e'" be set at the actual speed ratio "e" plus a small value $\alpha$. In this case, the speed ratio "e" of the transmission 14 is gradually changed when the speed-ration control routine 1 is executed.

Figure 7:
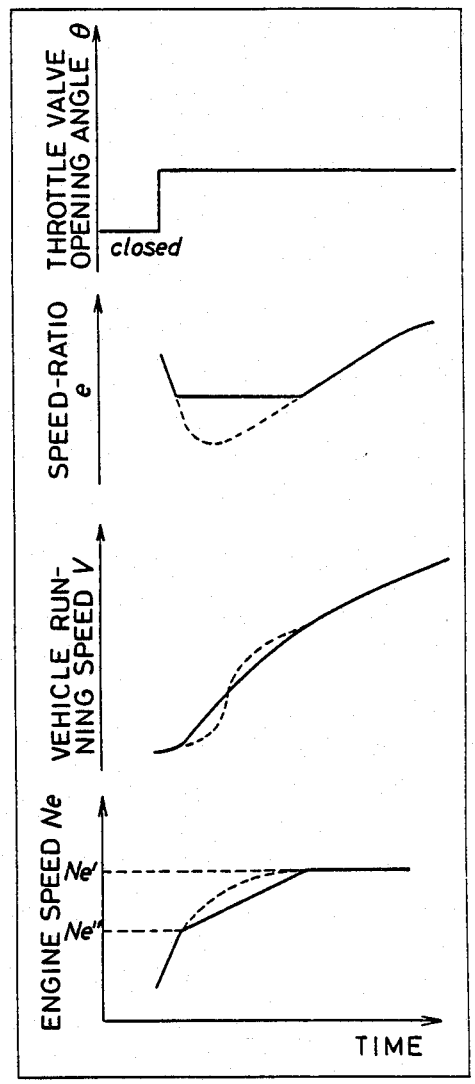
FIG. 7 is a timing chart showing an operational timing and changes in related variables of the embodiment of FIG. 1.

According to the instant embodiment which has been described hitherto, a change in the speed ratio "e" of the variable transmission 14 is inhibited or interrupted during a time span between the first moment when the actual speed Ne of the engine 10 has exceeded the variation-restraint trigger speed Ne", and the second moment when the actual engine speed Ne has reached the target engine speed Ne', as shown by a speed ratio curve in solid line in FIG. 7. This is contrary to a continuous change in the speed ratio in a traditional arrangement, as shown in broken line of the speed ratio curve of in FIG. 7. The inhibition of the speed ratio change or variation according to the invention minimizes a reduction in transmission efficiency due to change in the speed ratio "e" of the transmission 14 during acceleration of the vehicle, and thereby provides a reduction in specific-fuel consumption, i.e., an improvement in fuel economy.

As described previously, the variation-restraint trigger speed Ne" is determined by multiplying the obtained target engine speed Ne' by a predetermined transmission efficiency $\eta$. Hence, the acceleration performance or drivability of the vehicle is not influenced as experienced in a known arrangement. In the known arrangement, the transmission efficiency $\eta$ of the variable transmission 14 is reduced as the speed ratio thereof is varied during acceleration of the vehicle. The output of the engine while the speed ratio "e" is held constant is equal to an output which is obtained at an engine speed that is a product of the target engine speed Ne' multiplied by a transmission efficiency $\eta$. This is the point to which an attention is directed in the present invention in determining the variation-restraint trigger speed Ne".

In the known apparatus for controlling a variable transmission (14), after the actual engine speed Ne has been raised to the target engine speed Ne' with an abrupt depression of an accelerator pedal, the vehicle acceleration is effected with some shock irrespective of the operation of the acclerator pedal, due to an abrupt change in transmission efficiency $\eta$ of the transmission (14) upon stopping of variation in the speed ratio "e" and due to an inertia force of the engine 10, as indicated by a vehicle speed curve in broken line of FIG. 7. According to the present embodiment, however, the actual engine speed Ne is raised to the target engine speed Ne' without a change or variation in the speed ratio "e" of the transmission 14. As a result, otherwise possible development of a shock upon acceleration of the vehicle is minimized, as indicated by the vehicle speed curve in solid line of FIG. 7.

Figure 9:
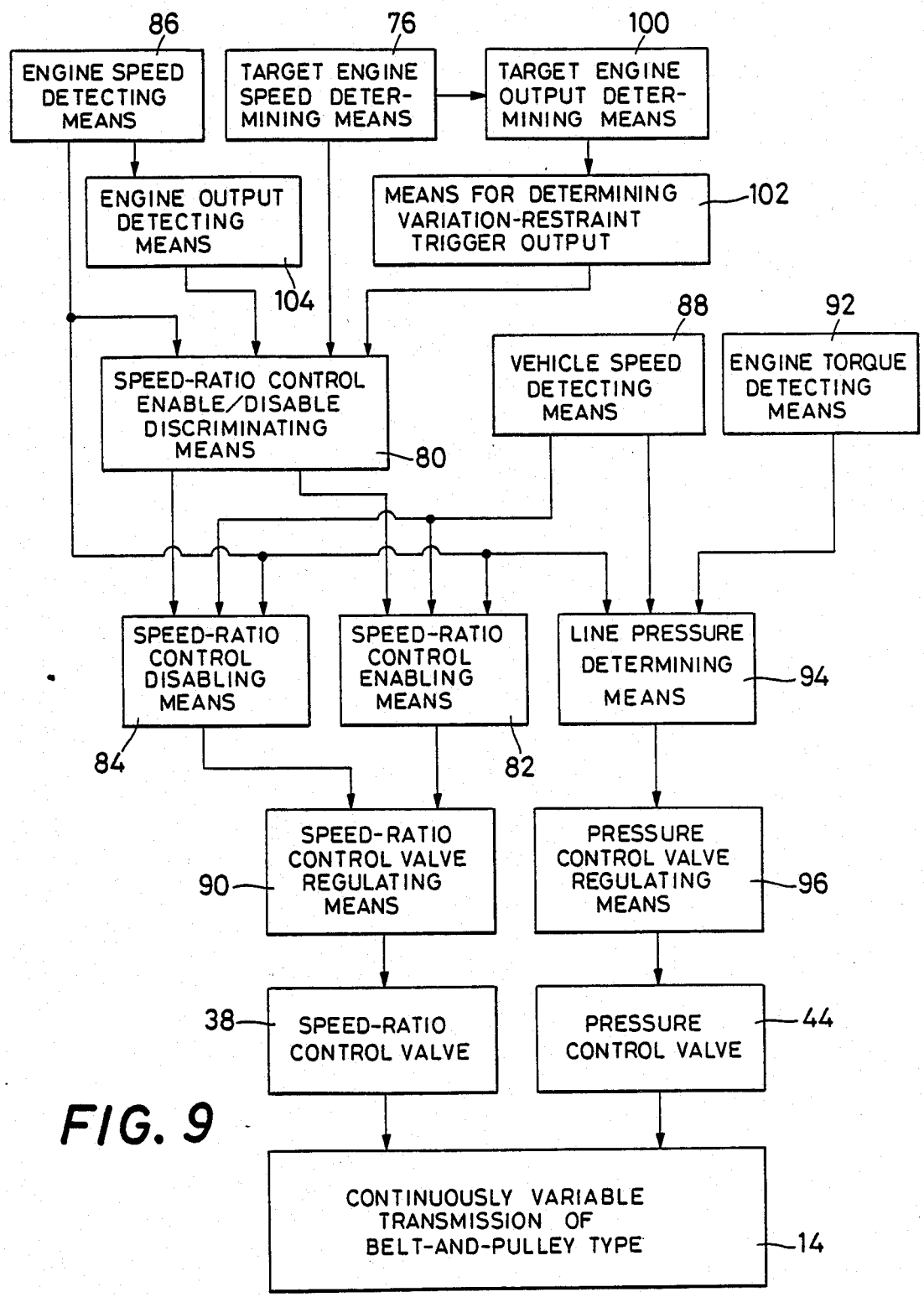

Referring next to FIGS. 8 and 9, another embodiment of the invention will be described. In these figures, the same reference characters as used in the preceding figures are used to identify the corresponding elements, and the description of these elements is omitted.

Figure 5:
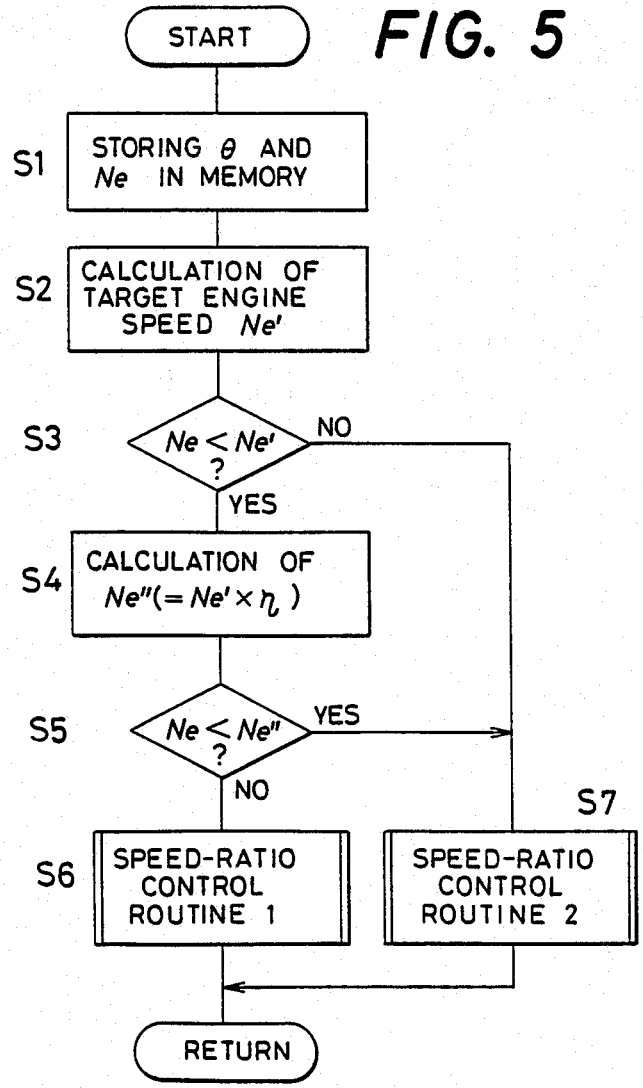
FIGS. 5 and 6 are flow charts illustrating the operation of the embodiment of FIG. 1.

In FIG. 8, steps S8 through S11 are provided in place of steps S4 and S5 of FIG. 5 of the preceding embodiment. In step S8 of FIG. 8, the target torque T' is calculated based on the target engine speed Ne' obtained in step S2 and on the opening angle θ of the throttle valve 54 detected in step S1, and according to the predetermined relation as shown in FIG. 4. The obtained target engine torque T' is multiplied by the target engine speed Ne' to obtain a target engine output Ps'. In the next step S9, a variation-restraint trigger output Ps" is calculated by multiplying the obtained target engine output Ps' by a transmission efficiency η of the variable transmission 14 during the acceleration. Step 9 is followed by step S10 wherein an actual engine output Ps is calculated according to the predetermined relation as shown in FIG. 4. Then, step S11 is executed to check if the actual engine output Ps is smaller than the variation-restraint trigger output Ps". If the actual engine output Ps is smaller than the variation-restraint trigger output Ps", step S11 is followed by step S7 in which the speed-ratio control routine 2 is carried out. If the output Ps is not smaller than the output Ps", that is, if the speed Ne has been raised to a level at which the engine 10 is able to provide, without a change in the speed ratio "e", an output (T×Ne) not less than the output (T×Ne'×η) which is obtained during acceleration of the vehicle if and when the transmission 14 is controlled by a known apparatus, step S11 is followed by step S6 in which the speed-ratio control routine 1 is performed.

FIG. 9 is a schematic block diagram showing a control arrangement according to this modified embodiment, wherein the above described steps S8, S9, S10 and S11 correspond respectively to: target engine speed determining means 100; means 102 for determining a variation-restraint trigger output Ps"; engine output detecting means 104; and speed-ratio control enable/disable discriminating means 80.

According to the instant embodiment, a variation or change in the speed ratio "e" of the variable transmission 14 is inhibited during a time span between the first moment when the actual engine output Ps has exceeded the variation-restraint trigger output Ps" and the second moment when the actual engine output Ps has reached the target engine ouput Ps'. Thus, the same result as obtained in the preceding embodiment is offered by this modified embodiment.

In addition, the embodiment of FIGS. 8 and 9 provides an advantage that the said time span during which the variation in the speed ratio "e" should be inhibited is determined more exactly and suitably, because variation-restraint trigger output Ps" of the engine is determined by multiplying the target engine output Ps' by a transmission efficiency η of the transmission 14.

While the present invention has been described in its preferred embodiments with reference to the accompanying drawing, it is to be understood that the invention is not limited thereto; but may be otherwise embodied.

For example, the invention is applicable to other types of continuously variable transmission than the variable transmission 14 in connection with which the illustrated embodiments have been described.

While an opening angle θ of the throttle valve 54 is used in the illustrated embodiments to detect a currently required output of the engine 10, it is possible that the required engine output be determined by detecting an amount of operation of the accelerator pedal 52, a vacuum pressure in the intake manifold 51, an amount of fuel injection, or other parameters which represent an output of the engine 10 which is currently required.

While the illustrated embodiments are adapted to inhibit or interrupt a variation in the speed ratio "e" of the transmission 14 during the predetermined time span as described before, it is appreciated that the speed ratio "e" be varied at a very low, i.e., restrained or limited rate for the predetermined time span.

As another modification, the first rotation sensor 60 for detecting a current or actual speed Ne of the engine 10 may be replaced by a sensor disposed on a distributor of the engine 10.

As a further modification, the actual engine output Ps may be obtained in step S10 of FIG. 8 by detecting an actual torque of the engine with a suitable torque sensor, and by multiplying a detected torque value by an actual engine speed.

Further, it is possible to arrange such that steps S6 of FIGS. 5 and 8 be executed only while the vehicle is in acceleration.

It will be obvious that other changes and modifications of the invention may occur to those skilled in the art within the scope of the invention defined in the appended claims.

What is claimed is:

1. A method of controlling a speed ratio of a continuously variable transmission for a vehicle for transmitting a rotary motion of an engine of the vehicle to drive wheels of the vehicle with a stepless speed change, by regulating the speed ratio of the transmission such that an actual speed of the engine coincides with a target speed thereof which is determined based on a currently required output of the engine and according to a predetermined relation between the target speed of the engine and the required output of the engine, said method comprising the steps of:

determining a variation-restraint trigger speed of the engine based on a predetermined transmission efficiency of said transmission and based on said target speed of the engine, said variation-restraint trigger speed of the engine being lower than said target speed of the engine; and restraining variation in said speed ratio of the transmission during a time span between a first moment when said actual speed of the engine has exceeded said variation-restraint trigger speed of the engine, and a second moment when said actual speed has reached said target speed of the engine.

2. A method as claimed in claim 1, wherein said predetermined transmission efficiency of the transmission is a value which is obtained during a rapid change in said speed ratio of the transmission.

3. A method as claimed in claim 2, wherein said variation-restraint trigger speed of the engine is obtained by multiplying said target speed of the engine by said predetermined transmission efficiency.

4. An apparatus for controlling a speed ratio of a continuously variable transmission for a vehicle for transmitting a rotary motion of an engine of the vehicle to drive wheels of the vehicle with a stepless speed change, including regulating means for controlling the speed ratio of the transmission such that an actual speed of the engine coincides with a target speed thereof which is determined based on a currently required output of the engine and according to a predetermined relation between the target speed of the engine and the required output of the engine, said apparatus comprising:

means for determining a variation-restraint trigger speed of the engine based on a predetermined transmission efficiency of said transmission and based on said target speed of the engine, said variation-restraint trigger speed of the engine being lower than said target speed of the engine; and means for restraining variation in said speed ratio of the transmission during a time span between a first moment when said actual speed of the engine has exceeded said variation-restraint trigger speed of the engine, and a second moment when said actual speed of the engine has reached said target speed of the engine.

5. An apparatus as claimed in claim 4, wherein said predetermined transmission efficiency of the transmission is a value which is obtained during a rapid change in said speed ratio of the transmission.

6. An apparatus as claimed in claim 5, wherein said variation-restraint trigger speed of the engine is obtained by multiplying said target speed of the engine by said predetermined transmission efficiency.

7. An apparatus as claimed in claim 4, further comprising:

speed detecting means for detecting said actual speed of the engine;

output detecting means for detecting said currently required output of the engine; and determining means for determining said target speed of the engine based on the detected required output of the engine and according to a predetermined relation between the required output and target speed of the engine, said regulating means controlling said speed ratio of the variable transmission such that said actual speed of the engine coincides with the determined target speed.

8. A method of controlling a speed ratio of a continuously variable transmission for a vehicle for transmitting a rotary motion of an engine of the vehicle to drive wheels of the vehicle with a stepless speed change, by regulating the speed ratio of the transmission such that an actual speed of the engine coincides with a target speed thereof which is determined based on a currently required output of the engine and according to a predetermined relation between the target speed of the engine and the required output of the engine, said method comprising the steps of:

determining an actual output of the engine;

determining a target output of the engine to obtain said target speed of the engine;

determining a variation-restraint trigger output of the engine based on a predetermined transmission efficiency of the transmission and based on the determined target output of the engine, said variation-restraint trigger output of the engine being smaller than said determined target output; and restraining variation in said speed ratio of the engine during a time span between a first moment when said actual output of the engine has exceeded said variation-restrain trigger output of the engine, and a second moment when said actual output of the engine has reached said target output of the engine.

9. A method as claimed in claim 8, wherein said predetermined transmission efficiency of the transmission is a value which is obtained during a rapid change in said speed ratio of the transmission.

10. A method as claimed in claim 9, wherein said variation-restraint trigger output of the engine is obtained by multiplying said target output of the engine by said predetermined transmission efficiency.

11. An apparatus for controlling a speed ratio of a continuously variable transmission for a vehicle for transmitting a rotary motion of an engine of the vehicle to drive wheels of the vehicle with a stepless speed change, including regulating means for controlling the speed ratio of the transmission such that an actual speed of the engine coincides with a target speed thereof which is determined based on a currently required output of the engine and according to a predetermined relation between the target speed of the engine and the required output of the engine, said method comprising the steps of:

first determining means for determining an actual output of the engine based on said actual speed of the engine and baed on said currently required output of the engine;

second determining means for determining a target output of the engine so as to obtain said target speed of the engine;

third determining means for determining a variation-restraint trigger output of the engine based on a transmission efficiency of the transmission during acceleration of the vehicle and based on the determined target output of the engine, said variation-restraint trigger output of the engine being smaller than said determined target output of the engine; and means for restraining variation in said speed ratio during a time span between a first moment when said actual output of the engine has exceeded said variation-restraint trigger output of the engine, and a second moment when said actual output of the engine has reached said target output of the engine.

12. An apparatus as claimed in claim 11, wherein said predetermined transmission efficiency of the transmission is a value which is obtained during a rapid change in said speed ratio of the transmission.

13. An apparatus as claimed in claim 12, wherein said variation-restraint trigger output of the engine is obtained by multiplying said target output of the engine by said predetermined transmission efficiency.

14. An apparatus as claimed in claim 11, further comprising:

speed detecting means for detecting said actual speed of the engine;

output detecting means for detecting said currently required output of the engine;

determining means for determining said target speed of the engine based on the detecting required output of the engine and according to a predetermined relation between the required output and target speed of the engine; and regulating means for controlling said speed ratio of the variable transmission such that said actual speed of the engine coincides with the determined target speed of the engine.

* * * * *